US008814002B2

(12) United States Patent
Pires et al.

(10) Patent No.: US 8,814,002 B2
(45) Date of Patent: Aug. 26, 2014

(54) DELIVERY SYSTEM

(75) Inventors: Leo Clifford Pires, Basking Ridge, NJ (US); Roger Hwang, Maple (CA); Rahul Bose, New Delhi (IN); Iti Seth, New Delhi (IN); Anjani Lal Pandey, Haryana (IN)

(73) Assignee: Zen Design Solutions Limited, Kowloon (HK)

( * ) Notice: Subject to any disclaimer, the term of this patent is extended or adjusted under 35 U.S.C. 154(b) by 130 days.

(21) Appl. No.: 13/593,950

(22) Filed: Aug. 24, 2012

(65) Prior Publication Data

US 2013/0056494 A1    Mar. 7, 2013

(30) Foreign Application Priority Data

Sep. 7, 2011    (IN) .............. 2571/DEL/2011

(51) Int. Cl.
*B67D 7/70* (2010.01)
*G01F 11/00* (2006.01)
*G01F 11/02* (2006.01)

(52) U.S. Cl.
CPC ............ *G01F 11/023* (2013.01); *G01F 11/025* (2013.01); *G01F 11/029* (2013.01); *G01F 11/021* (2013.01)
USPC ........... 222/135; 222/405; 222/390; 222/265; 222/276; 222/278

(58) Field of Classification Search
CPC ....... A45D 34/00; A45D 40/04; A45D 40/06; A45D 40/24; A45D 2200/054; A61M 35/003; B05C 17/00553; B05C 17/00576; B65D 81/325; B65D 83/0005; B65D 83/0011; G01F 11/021; G01F 11/025
USPC ......... 222/404, 405, 386, 390, 391, 135, 137, 222/265, 266, 269, 271, 272, 275, 276, 278, 222/144.5; 401/44, 45, 47, 171, 172, 174, 401/175
See application file for complete search history.

(56) References Cited

U.S. PATENT DOCUMENTS

| | | | | |
|---|---|---|---|---|
| 2,766,876 A | * | 10/1956 | Hopgood | 401/30 |
| 2,926,818 A | * | 3/1960 | Spero | 222/135 |
| 3,027,052 A | * | 3/1962 | Marraffino | 222/282 |
| 4,046,288 A | * | 9/1977 | Bergman | 222/135 |
| 4,240,566 A | * | 12/1980 | Bergman | 222/135 |
| 5,217,145 A | * | 6/1993 | Haan et al. | 222/129 |
| 5,647,481 A | | 7/1997 | Hundertmark et al. | |
| 5,865,345 A | | 2/1999 | Cistone et al. | |
| 6,129,472 A | * | 10/2000 | Thayer | 401/175 |
| 6,464,107 B1 | | 10/2002 | Brugger | |
| 6,499,900 B1 | * | 12/2002 | Brozell | 401/175 |
| 2007/0164048 A1 | * | 7/2007 | Lou | 222/137 |

* cited by examiner

*Primary Examiner* — Patrick M Buechner
(74) *Attorney, Agent, or Firm* — Patterson & Sheridan, LLP

(57) ABSTRACT

A delivery system for dispensing at least two products wherein the delivery system selectively dispenses one of products using a single actuator having two directions of rotation on a single axis of rotation. The delivery system of the invention is economical in manufacturing and has a lesser cycle time during manufacturing.

14 Claims, 6 Drawing Sheets

DELIVERY SYSTEM

CROSS-REFERENCE TO RELATED APPLICATION

This application claims benefit of Indian Provisional Application Ser. No. 2571/DEL/2011, filed Sep. 7, 2011, which is incorporated by reference in its entirety.

BACKGROUND

1. Field of the Invention

Embodiments of the present invention generally relate to a delivery system for dispensing product(s). More particularly, the present invention relates to a delivery system for dispensing multiple products wherein the delivery system selectively dispenses the multiple products using a single actuator having two directions of rotation on a single axis of rotation.

2. Description of the Related Art

Various types of dispensers have been developed for dispensing a plurality of fluid materials and many dual containers or multiple product packages are known in the art. A known means for dispensing two products involves the use of dual chambers placed adjacently in a container or a dispensing tube.

U.S. Pat. No. 6,464,107 to Brugger, discloses a proportioning dispenser for proportioning two components in an adjustable ratio. The products are supplied from the associated accommodating compartment each via a pump unit wherein the adjustment of the mixing ratio is effected by a transmission member, the point of application of which is adjustable with respect to the two pump units. The components are supplied to a common mixing chamber from where the mixture is conveyed to the dispenser nozzle.

U.S. Pat. No. 5,865,345 to Cistone et al. discloses a tube for dispensing two products simultaneously, and more specifically to a tube having two chambers formed from different materials. The body portion of the tube comprises of two adjacent chambers sharing a common wall wherein each chamber is in fluid communication with an orifice in the neck portion, and wherein the two chambers are formed from different materials.

Various dual fluid cartridge assemblies are also known. Such dual fluid cartridges assemblies are known to be used to dispense fluid materials such as adhesives, which typically contain two components that need to remain separated and applied quickly after mixing.

Attempts have also been made to provide a package that facilitates dispensing of two separate products for example in U.S. Pat. No. 5,647,481 to Hundertmark et al., is disclosed a dual container system for two-component hair dye. It discloses that the user assembles the two separate containers at the time of use. The system is such that the second component from the second container is made to enter the first container; thereby permitting mixing of first component with the second component and the mix is dispensed out of the dispensing nozzle.

Many of these prior art dual product dispensers described above and in general dispense the products after they are mixed in the dispensing or the mixer nozzle, or dispenses the mixture of products in adjustable quantities or at least two products in a user-defined ratio. A drawback associated with these kinds of packages is that such dual product dispenser does not allow the user to dispense only one product stored in the dispenser independently of the other product, thus forcing the user to use only the fixed or adjustable mixture of two products. In order to overcome these short-comings there were developed dual dispenser packages comprising a hollow barrel which consists of a first chamber and a second chamber containing the first and the second products respectively. The package may employ a push type dispensing or a screw type dispensing mechanism for each of its associated chamber storing the product. Generally each of these dispensing mechanisms include an actuator for each of its associated chamber, said actuators are connected to a barrel and both the actuators and the barrel are rotatably connected to each other. The drawback associated with this assembly is that the addition of two actuators in the dispensing package in order to allow the user to dispense one product independently of the another product, increases the complexity and cost of the dispensing device making it a less than desirable alternative. Further, since the number of parts is large, the manufacturing costs such as molding, assembly or the like is complicated and therefore it is desirable that a low cost be achieved.

Therefore, there is a need in the art for a delivery system which has a dispensing mechanism for selectively dispensing the products stored in it while minimize the manufacturing costs and simplify the production process. The present invention therefore, is directed to a delivery system that uses a single actuator in dual dispensing mechanism assembly and delivers each of the multiple products independently and at the same time is cost-effective in manufacturability. Also, the delivery system of the present invention is smaller in size and easy to use by virtue of it being efficiently portable.

SUMMARY

The present invention generally relates to a delivery system for dispensing product(s). More particularly, the present invention relates to a delivery system for dispensing at least two products wherein the delivery system selectively dispenses each of the at least two products using a single actuator having two directions of rotation on a single axis of rotation.

According to an embodiment of the present invention there is provided a delivery system that is economical in manufacturing and has a lesser cycle time during manufacturing. The invention provides for a delivery system which is inexpensive to produce, require inexpensive tooling and inexpensive fabricating procedures.

According to an embodiment of the present invention, the delivery system for dispensing at least two products comprises an outer body, the outer body comprises at least two chambers, wherein each of the at least two chambers contains one of the at least two products; an actuator engaged with the outer body, wherein the actuator rotates around its radial axis in a first direction and a second direction, and wherein the second direction is opposite to the first direction; and wherein the rotation of the actuator in at least one of the first direction or the second direction selectively dispenses one of the at least two products. According to an alternate embodiment, the actuator is capable of rotating around more than one of its axis in the first direction and the second direction, and wherein the rotation of the actuator in at least one of the first direction or the second direction selectively dispenses one of the at least two products.

In accordance with an aspect of the invention, the delivery system of the present invention comprises a first chamber and a second chamber, wherein the first chamber and the second chamber contain a first product and a second product respectively, and an actuator.

According to a preferred embodiment of the invention, the first and the second chambers are arranged in a series in a barrel or in a tube and are axially aligned to each other. Each of said chambers have a respective first piston and a second piston for discharging the first product and the second product respectively, wherein the actuator provides a linear force along the longitudinal axis of said chambers to displace each of the first piston and the second piston individually with respect to their respective chambers for discharging the products there from. The delivery system further comprises two motion converters.

According to an embodiment of the present invention there is provided a delivery system comprising a first motion converter and a second motion converter which are configured such that when the actuator is rotated in a first direction (clockwise or anti-clockwise direction), the first motion converter is engaged with the actuator to allow linear movement of its associated first piston rod, which in turn causes the linear displacement of the first piston to discharge the first product stored in its associated first chamber. At the same time, the second motion converter will not engage with the actuator and thus no linear movement of its associated second piston rod will take place. In order to discharge the second product, the actuator is rotated in a direction opposite to the first direction in which the second motion converter gets engaged with the actuator to allow the linear movement of its associated second piston rod with respect to its associated second chamber.

According to an embodiment of an invention the delivery system comprises two chambers for storing two products, two piston assemblies associated with the two chambers, and an actuator. The two piston assemblies further comprise two delivery screws, two pistons, two piston rods, two motion converters. Each of the pistons is disposed inside its corresponding chamber, and is operatively engaged with proximal end of its respective piston rod, such that the piston is linearly displaceable with respect to the chamber. Each of the piston rods is arranged to be engaged with its corresponding delivery screw and the motion converter so as to allow its linear rotational movement along its longitudinal axis with respect to the associated delivery screw. The linear rotational movement of the piston rod means that while the piston rod is capable of rotating along its longitudinal axis, it is also capable of linear movement along its longitudinal axis. The delivery screw is structured such that its inner periphery has engagement means such as threads or ribs to compliment an engagement means present on the outer periphery of the piston rod. The motion converters are inserted into the hollow portion of their associated delivery screws.

According to an embodiment of the invention, each of the motion converters is engaged with its associated piston rod such that the piston rod is non rotatable with respect to the motion converter. Each of the motion converters has a generally cylindrical shape having an upper side wall and a lower sidewall. The upper sidewall has at least one flat shaped surface on its inner periphery to compliment with the at least one flat shaped side wall present on the outer periphery of the corresponding piston rod and thereby form a secure engagement between the motion converter and the piston rod.

According to an embodiment of the invention, each of the motion converters comprises a plurality of extensions present on outer periphery of its lower sidewall and its upper side wall. The plurality of extensions includes a first set of extensions present on the outer periphery of the lower side wall and a second set of extensions present on the outer periphery of the upper side wall respectively. The extensions of the lower sidewall and the upper side wall may have a profile that operatively engages with a complimentary profile of extensions present on the inner periphery of the actuator and on the inner periphery of the delivery screw respectively. This structural engagement between the motion converters, and the actuator and the delivery screws is such that the movement of actuator in a first direction (clock wise) causes one of the motion converters to engage with the actuator and allow the linear rotational movement of its associated piston rod while the other motion converter will not engage with the actuator. The movement of associated piston rod in turn causes the linear displacement of associated piston to discharge the first product stored in its associated chamber. Similarly, the movement of the actuator in the second direction which is opposite to the first direction (anti-clockwise) will result in the discharge of the second product stored in said delivery system.

According to another embodiment, the extensions present on the inner periphery of the actuator further include a first set of extensions and a second set of extensions, wherein the first set of extensions present on the lower side wall of the first motion converter have a profile that operatively engages with a complimentary profile of the first set of extensions present on the inner periphery of the actuator; and wherein the first set of extensions present on the lower side wall of the second motion converter have a profile that operatively engages with a complimentary profile of the second set of extensions present on the inner periphery of the actuator.

According to a further embodiment, the first set of extensions and the second set of extensions of the actuator are present at different heights on the inner periphery of the actuator.

According to an embodiment of the present invention the plurality of extensions on the first motion converter are placed at a different height along its longitudinal axis in comparison to the placements of the extensions on the longitudinal axis of the second motion converter.

According to a further embodiment of the present invention the first set of extensions present on the lower side wall of the first motion converter is placed at a different height along its longitudinal axis in comparison to the placements of the first set of extensions present on the longitudinal axis of the lower side wall of the second motion converter.

According to an embodiment of the present invention the profile of the plurality of extensions present on outer periphery of the lower and the upper side wall of motion converters, inner periphery of the actuator and inner periphery of the delivery screws has a flat shaped edge and an inclined shaped edge. In the present invention the structural arrangement between the motion converter, the actuator and the delivery screw is such that the movement of the actuator in first direction results in the engagement of the flat shaped edge of the extensions on the lower side wall of the first motion converter with the complimentary flat shaped edge of the extensions of the actuator. This allows the rotational movement of the first motion converter with respect to the first delivery screw which results in the linear rotational movement of the first piston rod which in turn causes the linear displacement of the first piston to discharge the first product stored in its associated first chamber. Simultaneously, the flat shaped edge of the extensions on the lower side wall of the second motion converter does not engage with the complimentary flat shaped edge of the extensions present on the actuator. Such an arrangement prevents the rotational movement of the second motion converter with respect to the second delivery screw and thus no second product is discharged from the second chamber. Similarly, the movement of the actuator in second direction results in the engagement of the flat shaped edge of the extensions on the lower side wall of the second motion converter with the complimentary flat shaped edge of the extensions of the actuator. This allows the rotational movement of the second motion converter with respect to the second delivery screw which results in the linear rotational movement of the second piston rod which in turn causes the linear displacement of the second piston to discharge the second product stored in its associated second chamber. Simultaneously, the flat shaped edge of the extensions on the lower side wall of the first motion converter does not engage with the complimentary flat shaped edge of the extensions present on the actuator. Such an arrangement prevents the rotational movement of the first motion converter with respect to the delivery screw and thus no first product is discharged from the second chamber.

According to another embodiment of the present invention, the first motion converter and the second motion converter are magnetically engaged with respective first delivery screw and the second delivery screw and with the actuator.

According to an embodiment of the present invention the actuator provides the force to actuate the dispensing of the product. However, the force required to operate the actuator may be applied manually, pneumatically, hydraulically or through various other types of displacement mechanisms.

According to an embodiment of the present invention there is provided a delivery system for dispensing metered dosage of product/bulk upon actuation.

According to an embodiment of the present invention, there is provided a delivery system comprising at least two chambers for storing at least two products and an actuator, wherein the force required to actuate the actuator remains constant throughout the shell life of the delivery system.

According to an embodiment of the invention there is provided a delivery system for dispensing a product in a user-defined dosage. There is also provided a delivery system that is easy to operate by a user and is portable as it can be produced in the form of a pen as well.

According to an embodiment of the invention there may be provided a transparent outer body area of the delivery system that would keep the user informed of the products kept inside the delivery system and thereby making it informative as well as attractive for the user.

Thus, the present invention provides for a simplified, cost-effective, inexpensive, and efficient delivery system.

The delivery system of the present invention may be used to dispense a wide variety of consumer and industrial products related to cosmetic, skin care, hair care, oral care, personal care, pharmaceutical, wound care, orally administrable products, home-care or adhesives.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
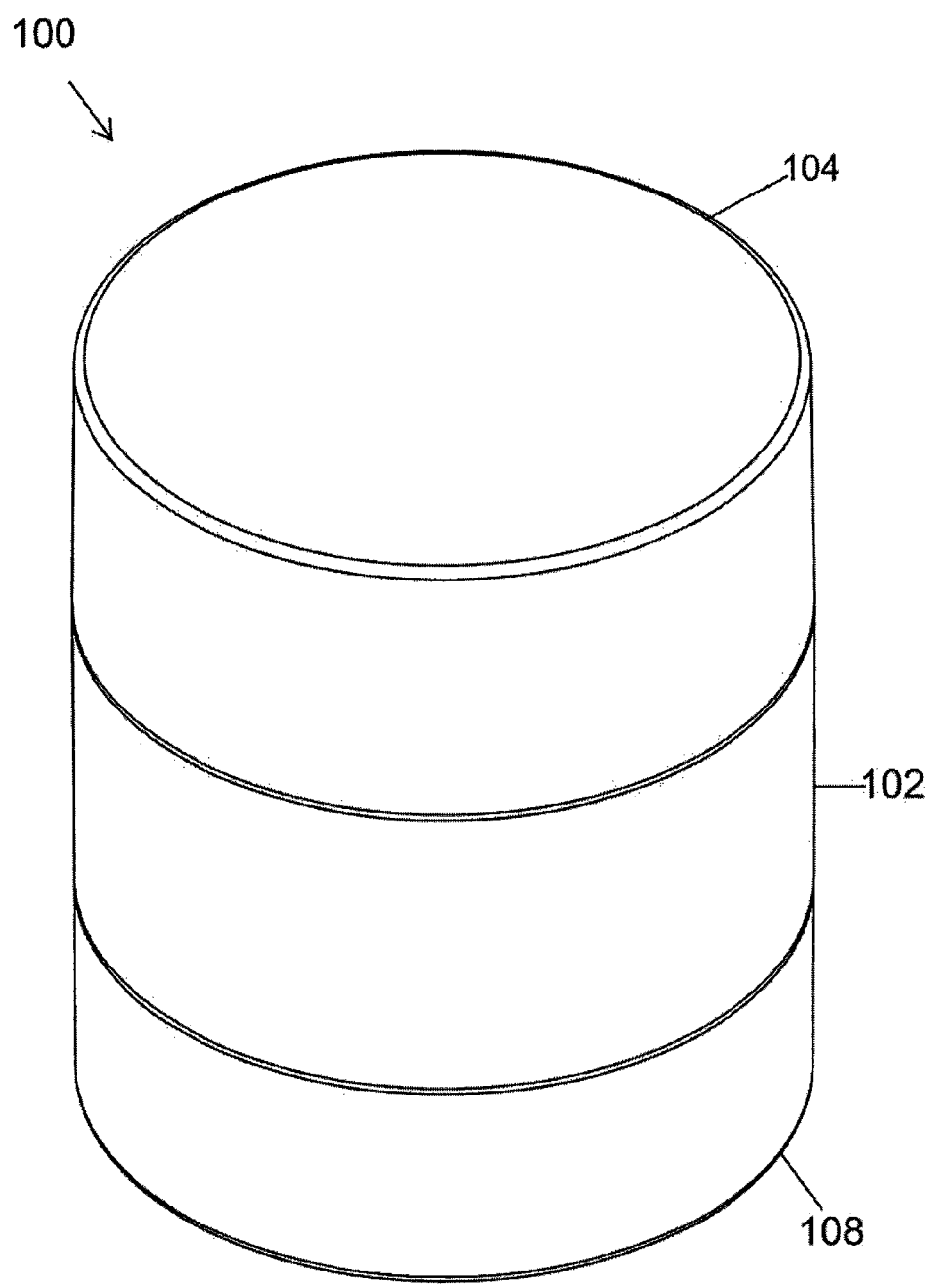
FIG. 1 is an isometric view of the delivery system according to one embodiment of the present invention.

To facilitate understanding, identical reference numerals have been used, where possible, to designate identical elements that are common to the figures. It is to be noted, however, that the appended drawings illustrate only typical embodiments of this invention and are therefore not to be considered limiting of its scope, for the invention may admit to other equally effective embodiments.

DETAILED DESCRIPTION

FIGS. 1 through to 5b illustrate a delivery system 100 according to one embodiment of the invention.

Figure 2:
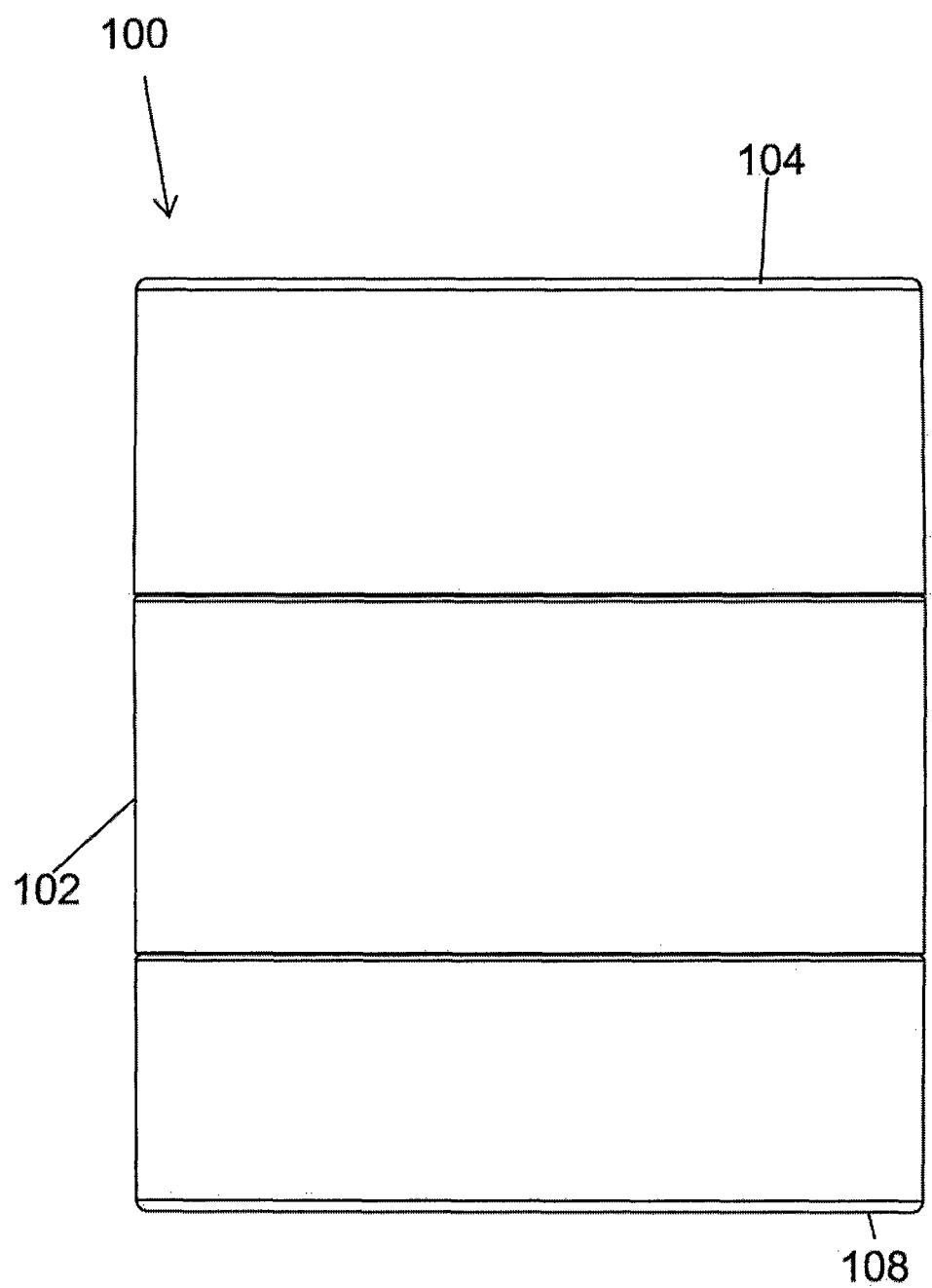
FIG. 2 is a front perspective view of the delivery system as shown in FIG. 1.
Figure 3:
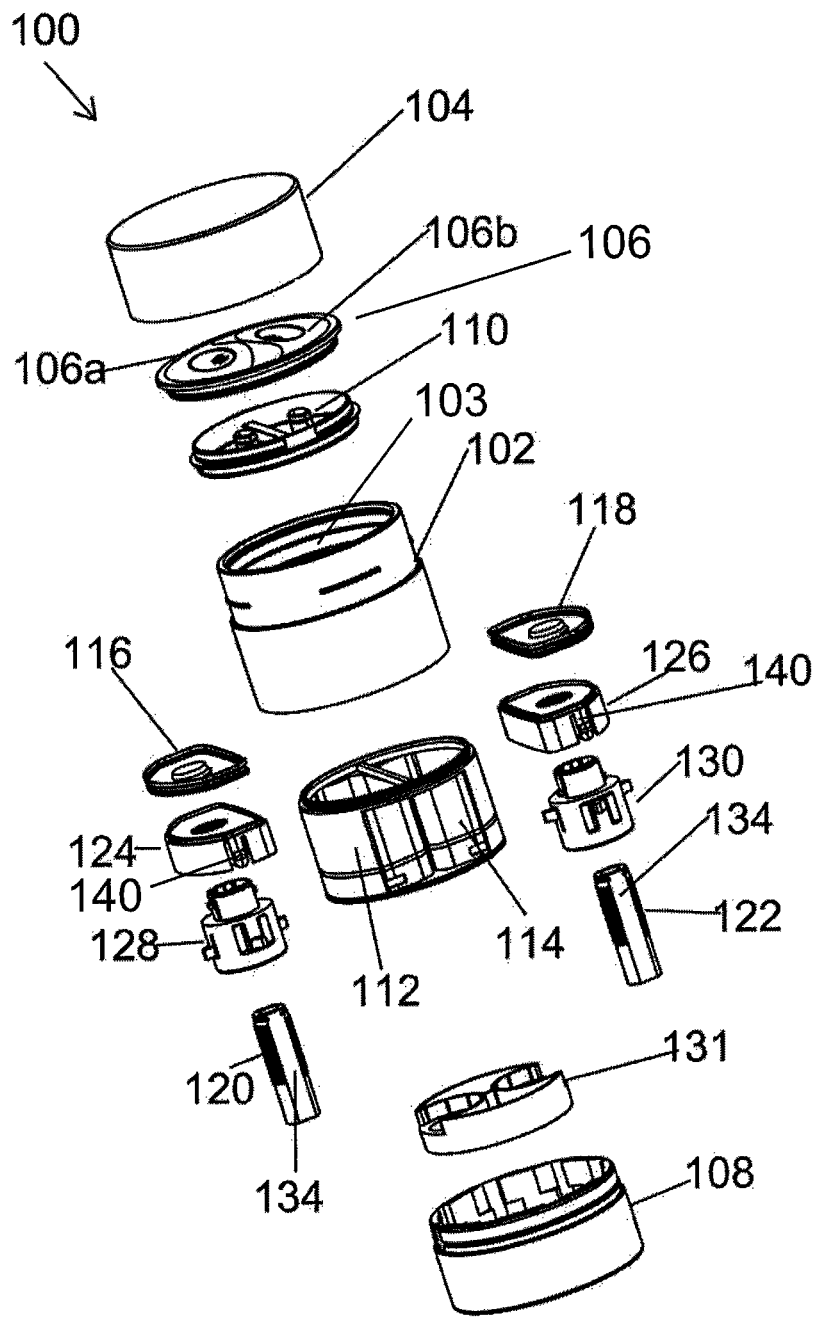
FIG. 3 is an exploded view of the delivery system as shown in FIG. 1.
Figure 4:
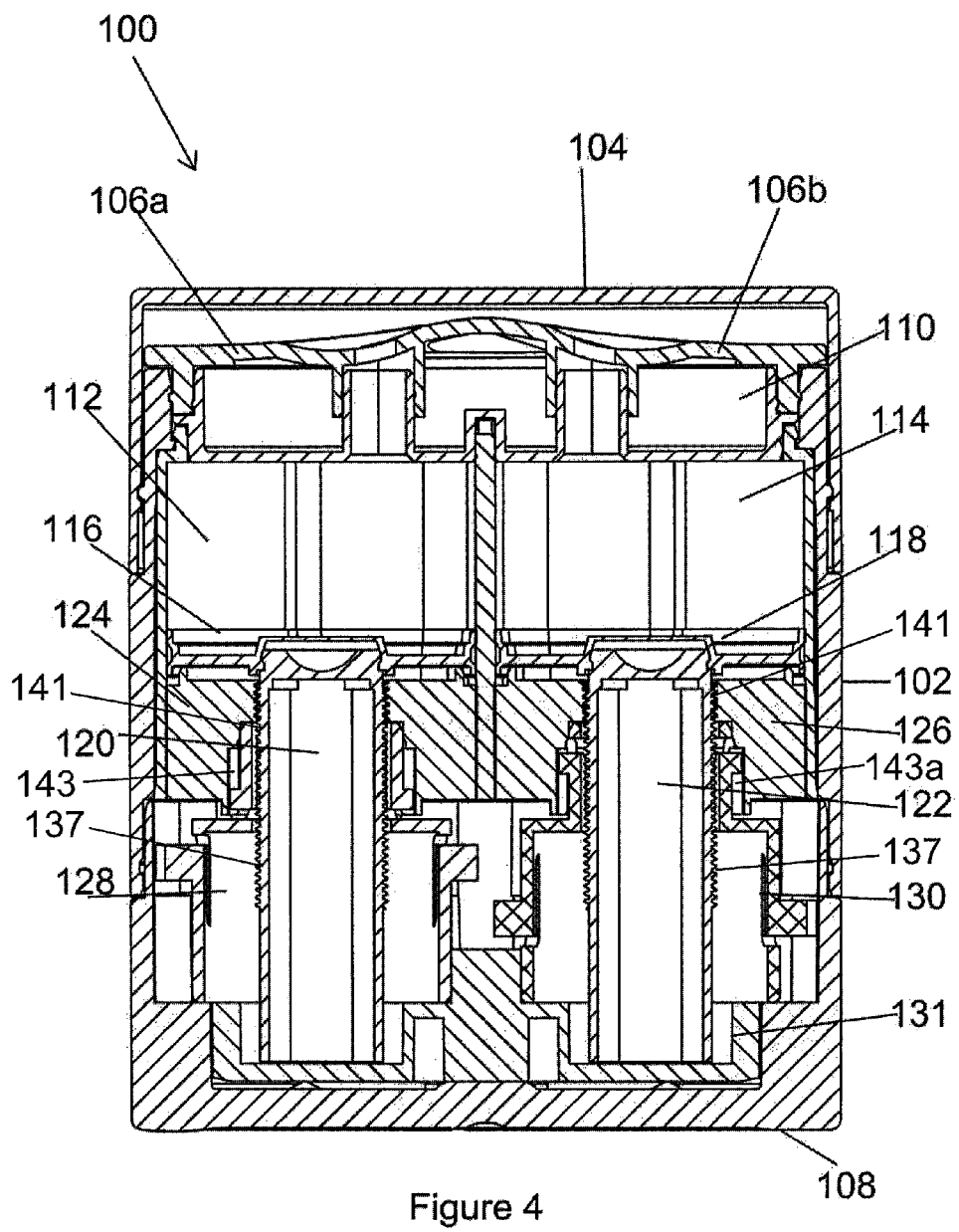
FIG. 4 is a sectional view of the delivery system as shown in FIG. 1.
Figure 5A:
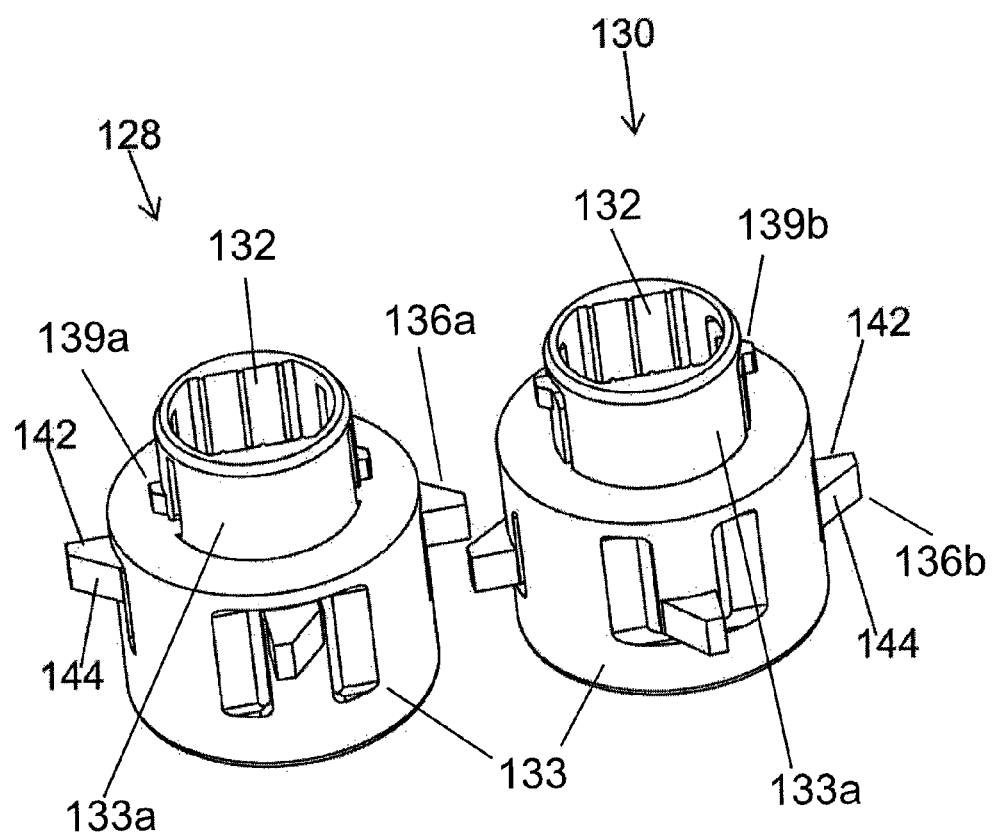
FIG. 5a is an isometric view of the motion converters of the delivery system as shown in FIG. 3.
Figure 5B:
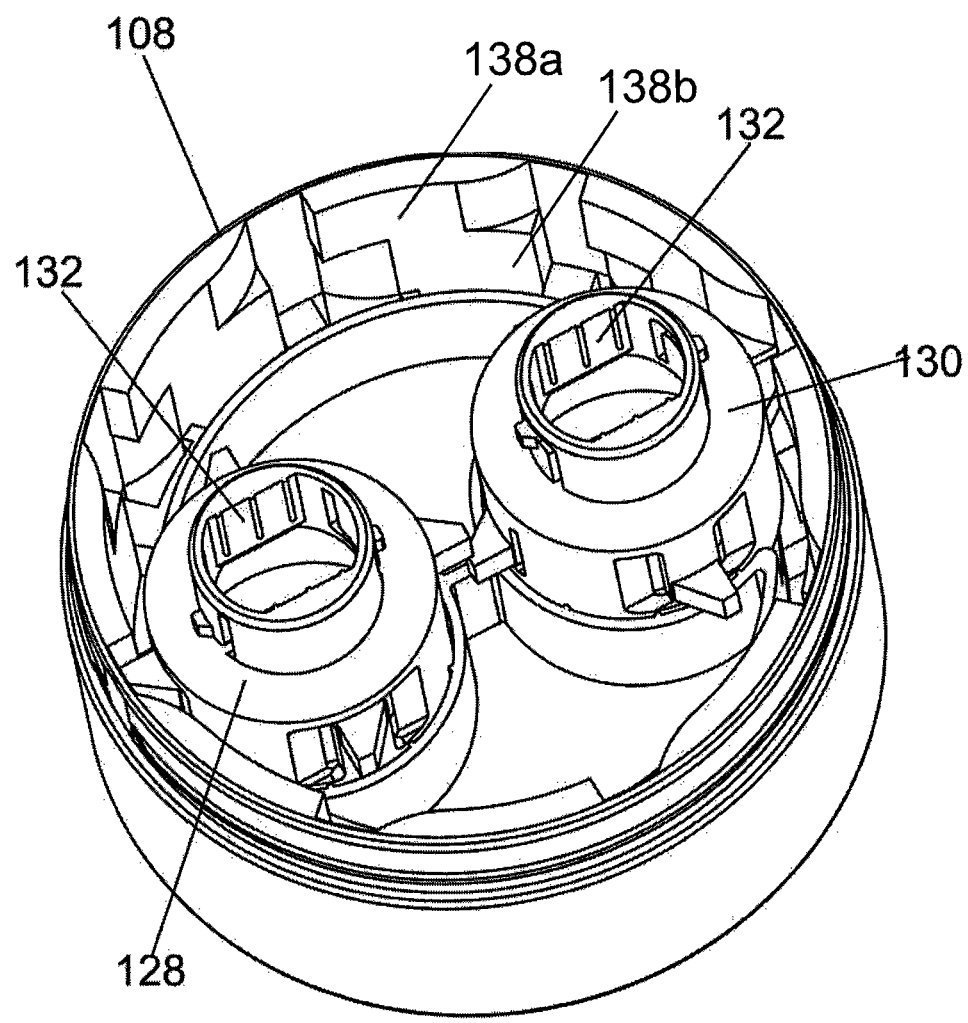
FIG. 5b shows engagement of motion converters with the actuator in the delivery system of the FIG. 3.

As shown in FIGS. 1 to 3, the delivery system comprises an outer body 102, and a cover 104. The outer body 102 has a proximal end and a rear end and has a cavity 103 to accommodate a first chamber 112 and a second chamber 114. It will be apparent to a person having ordinary skill in the art that the cavity 103 may include more than two chambers without limiting the scope of the disclosed embodiments. The delivery system 100 further comprises an applicator 106 and an actuator 108. The proximal end of the outer body 102 accommodates the applicator 106. The rear end of the outer body 102 is engaged to the actuator 108. The actuator 108 provides the force to actuate the movement of the product stored in the first chamber 112 and the second chamber 114 in the delivery system 100. As shown in FIGS. 3 and 4, the applicator 106 further comprises a first applicator 106a and a second applicator 106b, the applicator 106 is accommodated in an applicator holder 110, and the applicator holder 110 engages with the outer body 102.

As further illustrated in FIGS. 1 to 4, the first chamber 112 and the second chamber 114 are fixedly disposed inside the cavity 103 such that the first chamber 112 and the second chamber 114 are arranged in series and are in axial alignment with each other. In an embodiment, the first chamber 112 and the second chamber 114 contain a first product and a second product respectively (not shown in the Figures). The delivery system 100 further comprises a first piston assembly and a second piston assembly associated with the first chamber 112 and the second chamber 114 respectively. It will be apparent to a person having ordinary skill in the art that the delivery system may comprise more than two piston assemblies without limiting the scope of the disclosed embodiments. The number of piston assemblies will be proportional to the number of chambers present in the cavity 103. The first piston assembly comprises a first piston 116, a first piston rod 120, a first delivery screw 124, and a first motion converter 128. The second piston assembly comprises a second piston 118, a second piston rod 122, a second delivery screw 126, and a second motion converter 130. The first piston rod 120 and the second piston rod 122 are arranged to be engaged with the corresponding first delivery screw 124 and the second delivery screw 126 and with the actuator 108 such that linear rotational movement of the first piston rod 120 and the second piston rod 122 with respect to the first delivery screw 124 and the second delivery screw 126 is allowed. Each of the first delivery screw 124 and the second delivery screw 126 has a first engagement means including threads 141 on its inner periphery to engage with a complimentary second engagement means including threads 137 present on the outer periphery of the first piston rod 120 and the second piston rod 122 respectively. It will be apparent to a person having ordinary skill in the art that the first delivery screw 124 and the second delivery screw 126 may include ribs as engagement means on their inner periphery in an alternate embodiment of the present invention. Each of the first delivery screw 124 and the second delivery screw 126 has an attachment means for fixedly attaching the corresponding first delivery screw 124 and the second delivery screw 126 within the first chamber 112 and the second chamber 114 respectively. A clamp 131 is placed inside the actuator 108 for clamping the first motion converter 128 and the second motion converter 130.

Each of the first piston 116 and the second piston is disposed inside its corresponding first chamber 112 and the second chamber 114, and is engaged with proximal end of the first piston rod 120 and the second piston rod 122 respectively.

In the delivery system 100 as shown in FIGS. 3 to 5b, each of the first motion converter 128 and the second motion converter 130 has an upper sidewall 133a and a lower sidewall 133. The upper sidewall 133a of each of the first motion converter 128 and the second motion converter 130 is inserted into the hollow portion of its associated first delivery screw 124 and the second delivery screw 126. Further each of the first motion converter 128 and the second motion converter 130 is structured such that its upper sidewall 133a has at least one flat shaped surface 132 on its inner periphery to compliment with at least one flat shaped side wall 134 present on the outer periphery of the first piston rod 120 and the second piston rod 122 respectively, so as to prevent rotational movement of the first piston rod 120 and the second piston rod 122 with respect to the corresponding first motion converter 128 and the second motion converter 130. The first motion converter 128 and the second motion converter 130 have plurality of extensions including a respective first set of extensions 136a and 136b on the outer periphery of their lower sidewalls 133, and have respective second set of extensions 139a and 139b on their upper sidewalls 133a. The first set of extensions 136a and 136b of the respective first motion converter 128 and the second motion converter 130 have a profile that operatively engages with their respective complimentary profile of first set of extensions 138a and the second set of extensions 138b present on the inner periphery of the actuator 108. The second set of extensions 139a and 139b of the respective first motion converter 128 and the second motion converter 130 have a profile that operatively engages with the complimentary profile of extensions 143 and 143a present on the inner periphery of the first delivery screw 124 and the second delivery screw 126 respectively.

The profile of the plurality of extensions 136a, 139a of the first motion converter 128; the plurality of extensions 136b, 139b of the second motion converter 130; the plurality of extensions 138a, 138b of the actuator 108; and the plurality of extensions 143, 143a of the delivery screws 124 and 126, comprises a flat shaped edge 142 and an inclined shaped edge 144.

During the operation of the delivery system 100, the movement of the actuator 108 in the first direction results in the engagement of the flat shaped edge 142 of the first set of extensions 136a of the first motion converter 128 with the complimentary flat shaped edge 142 of the first set of extensions 138a of the actuator 108. This results in rotation of the first motion converter 128 with respect to the first delivery screw 124 causing linear rotational movement of the first piston rod 120 along its longitudinal axis, which in turn causes the linear displacement of the first piston 116 to push forward the first product stored in its associated first chamber 112 towards the first applicator 116a for being dispensed out. At the same time, the flat shaped edge 142 of the first set of extensions 136b of the second motion converter 130 does not engage with the complimentary flat shaped edge 142 of the second set of extensions 138b of the actuator 108 and the inclined shaped edge 144 of the first set of extensions 136b of the second motion converter 130 rides over the complimentary inclined shaped edge 144 of the second set of extensions 138b of the actuator 108. Such an arrangement prevents the rotation of the second motion converter 130 with respect to the second delivery screw 126, and thus no second product is discharged from the second chamber 114 of the delivery system 100.

Similarly, the movement of the actuator 108 in second direction which is opposite to the first direction, results in the engagement of the flat shaped edge 142 of the first set of extensions 136b of the second motion converter 130 with the complimentary flat shaped edge 142 of the second set of extensions 138b of the actuator 108. This results in rotation of the second motion converter 128 with respect to second delivery screw 126 causing linear rotational movement of the second piston rod 122 along its longitudinal axis, which in turn causes the linear displacement of the second piston 118 to push forward the second product stored in its associated second chamber 114 towards the second applicator 106b for being dispensed out. At the same time, the flat shaped edge 142 of the first set of extensions 136a of the first motion converter does not engage with the complimentary flat shaped edge 142 of first set of extensions 138a of the actuator and the inclined shaped edge 144 of the first set of extensions 136a of the first motion converter 128 rides over the complimentary inclined shaped edge 144 of first set extensions 138a of the actuator 108. Such an engagement prevents the rotation of the first motion converter 128 with respect to first delivery screw 124 and thus no first product is discharged from the first chamber 112 of the delivery system 100.

The actuator 108 provides the force to actuate the dispensing of the product. However, the force required to operate the actuator may be applied manually, pneumatically, hydraulically or through various other types of displacement mechanisms.

The outer body 102 of the delivery system 100 according to the invention may be formed of a polymeric material such as PCTA, polypropylene or any other suitable material. The outer body 102 may have any suitable shape such as cylindrical, rectangular or any other suitable shape. The actuator of the delivery system 100 according to the invention may be formed of a suitable polymeric material such as styrene acrylonitrile or acrylonitrile butadiene styrene or any other suitable material. The materials suitable for forming the first piston rod 120 and the second piston rod 122 may be polyacetal or any other suitable polymeric/non-polymeric material. The material for forming piston 116 and 118 may be any suitable polymeric material such as polypropylene, polyacetal or low-density polyethylene or any other suitable material. The material for forming the first delivery screw 124 and the second delivery screw 126 may be polyacetal or any other suitable polymeric material. The cover 104 of the delivery system 100 may be formed of a suitable polymeric material such as acrylonitrile butadiene styrene or polypropylene or any other suitable material. The aforementioned materials for forming various parts of the delivery system 100 and the dispensing mechanism assembly of the present invention are an example, however other suitable materials may also be used.

Although the above description and drawings show the delivery system 100 being cylindrical, the shapes and profile cross section thereof are not limited to the same. Also, the applicator 106a, 106b of the delivery system 100 may have any suitable form to target a specific application. The applicator 106a, 106b may be cylindrical and slightly domed on top having concentric grooves with multiple orifices that contain the product when they are being dispensed. The applicator 106a, 106b may alternatively have any suitable construction which helps in application of the product.

The delivery system 100 of the present invention may be used to deliver a wide variety of consumer and industrial products related to cosmetic, skin care, hair care, oral care, personal care, pharmaceutical, wound care, orally administrable products, home-care or adhesives.

Various examples of the products where the delivery system of the present invention could be used are but not limited to cheek blush, cheek plumping gel/cream, lip plumping gel/cream, moisturizer, sunscreen, temporary hair colors, hair styling gel, hair mousse, hair repair cream, hydrating cream, antiseptic and correction cream, acne treatment cream, concealer, blemish concealer, skin treatment cream, hair repair cream, anti-dandruff cream, hair treatment serum, scalp hydrating oils, teeth whitening gel, teeth whitening and teeth lamination solutions, pain relieving cream, antibiotic cream and analgesic cream, antipyretic and analgesic serums/solutions, bleaching agent, fabric softener, stain remover, bleaching agent, adhesive gels.

While the foregoing is directed to embodiments of the present invention, other and further embodiments of the invention may be devised without departing from the basic scope thereof, and the scope thereof is determined by the claims that follow.

What is claimed is:

1. A delivery system for dispensing at least two products, the delivery system comprising:
an outer body, the outer body comprising at least two chambers, wherein each of the chambers contains one of the products;
an actuator operatively coupled to the outer body and configured to selectively rotate around its radial axis in a first direction or in a second direction, wherein the second direction is opposite to the first direction;
wherein the rotation of the actuator in the first direction or the second direction selectively dispenses one of the at least two products;
wherein the outer body has a proximal end and a rear end, and a cavity that accommodates the chambers; wherein the proximal end accommodates an applicator and the rear end is engaged to the actuator;
wherein the chambers include a first chamber and a second chamber that are arranged in series with each other to contain a first product and a second product respectively; and
wherein the first chamber and the second chamber are associated with a first piston assembly and a second piston assembly respectively.

2. The delivery system according to claim 1, wherein the delivery system selectively dispenses metered dosage of one of the at least two products upon actuation.

3. A delivery system for dispensing at least two products, the delivery system comprising:
an outer body, the outer body comprising at least two chambers, wherein each of the chambers contains one of the products;
an actuator operatively coupled to the outer body and configured to selectively rotate around its radial axis in a first direction or in a second direction, wherein the second direction is opposite to the first direction;
wherein the rotation of the actuator in at least one of the first direction or the second direction selectively dispenses one of the products;
wherein the outer body has a proximal end and a rear end, and a cavity that accommodates the chambers; and
wherein the proximal end accommodates an applicator and the rear end is engaged to the actuator;
wherein the chambers include a first chamber and a second chamber that are arranged in series with each other to contain a first product and a second product respectively;
wherein the first chamber and the second chamber are associated with a first piston assembly and a second piston assembly respectively;
wherein the first piston assembly comprises a first piston, a first piston rod, a first delivery screw, and a first motion converter; and wherein the second piston assembly comprises a second piston, a second piston rod, a second delivery screw, and a second motion converter.

4. The delivery system according to claim 3, wherein the first piston and the second piston are engaged at a proximal end of the first piston rod and the second piston rod respectively.

5. The delivery system according to claim 3, wherein each of the first motion converter and the second motion converter is engaged with the corresponding first piston rod and the second piston rod such that each of the first piston rod and the second piston rod is non rotatable with respect to the first motion converter and the second motion converter respectively.

6. The delivery system according to claim 5, wherein each of the first motion converter and the second motion converter is structured such that its upper sidewall has at least one flat shaped surface on its inner periphery to compliment with at least one flat shaped side wall present on the outer periphery of the first piston rod and the second piston rod respectively.

7. The delivery system according to claim 3, wherein the first piston rod and the second piston rod are arranged to be engaged with the corresponding first delivery screw and the second delivery screw to allow linear rotational movement of the first piston rod and the second piston rod with respect to the corresponding first delivery screw and the second delivery screw.

8. The delivery system according to claim 7, wherein an inner periphery of the first delivery screw and the second delivery screw has a respective first engagement means to compliment with a respective second engagement means present on an outer periphery of the first piston rod and the second piston rod.

9. The delivery system according to claim 8, wherein the first engagement means and the second engagement means are selected from at least one of threads or ribs.

10. The delivery system according to claim 3, wherein each of the first motion converter and the second motion converter has at least two sets of extensions present on its outer periphery including a first set of extensions and a second set of extensions, and wherein the first set of extensions have a profile that operatively engages with a complimentary profile of extensions present on an inner periphery of the actuator and the second set of extensions have a profile that operatively engages with a complimentary profile of extensions present on an inner periphery of the first delivery screw and the second delivery screw respectively.

11. The delivery system according to claim 10, wherein the profile of the extensions of each of the first and the second motion converters, the extensions of the actuator and the extensions of the first delivery screw and the second delivery screw, includes a flat shaped edge and an inclined shaped edge.

12. The delivery system according to claim 10, wherein the first set of extensions present on a lower side wall of the first motion converter is placed at a different height along its longitudinal axis in comparison to the placements of the first set of extensions present on the longitudinal axis of a lower side wall of the second motion converter.

13. The delivery system according to claim 10, wherein the extensions present on the inner periphery of the actuator includes a first set of extensions and a second set of extensions, wherein the first set of extensions and the second set of extensions are present at different heights on the inner periphery of the actuator, and wherein the first set of extensions of the first motion converter has a profile that operatively engages with a complimentary profile of the first set of extensions present on the inner periphery of the actuator; and wherein the first set of extensions of the second motion converter has a profile that operatively engages with a complimentary profile of the second set of extensions present on the inner periphery of the actuator.

14. A delivery system for selectively dispensing one of at least two products, the delivery system comprising:
- an outer body, the outer body comprising at least two chambers, wherein the chambers include a first chamber and a second chamber containing a first product and a second product respectively;
- a first piston assembly comprising a first piston, a first piston rod, a first delivery screw, and a first motion converter;
- a second piston assembly comprising a second piston, a second piston rod, a second delivery screw, and a second motion converter; and
- an actuator engaged with the outer body, wherein the actuator rotates around its radial axis in a first direction and a second direction, and wherein the second direction is opposite to the first direction; and
- wherein the first delivery screw and the second delivery screw are engaged with respect to the first piston rod and the second piston rod to allow linear rotational movement of the respective first piston rod and the second piston rod along their longitudinal axis; and
- wherein the first piston and the second piston are engaged with a proximal end of the first piston rod and the second piston rod respectively; and
- wherein the first piston rod and the second piston rod are non-rotatable with respect to the first motion converter and the second motion converter respectively; and
- wherein each of the first motion converter and the second motion converter has a plurality of extensions having a profile that operatively engages with a complimentary profile of the extensions of the actuator; and
- wherein rotation of the actuator either in the first direction or in the second direction causes rotation of either the first motion converter or the second motion converter which results in respective linear rotational movement of the first piston rod or the second piston rod along respective longitudinal axis which in turn causes the linear displacement of the first piston or the second piston respectively to dispense the first product or the second product stored in the first chamber or the second chamber respectively.

* * * * *